United States Patent [19]

Syeda-Mahmood

[11] Patent Number: 5,983,218
[45] Date of Patent: Nov. 9, 1999

[54] MULTIMEDIA DATABASE FOR USE OVER NETWORKS

[75] Inventor: Tanveer F. Syeda-Mahmood, Rochester, N.Y.

[73] Assignee: Xerox Corporation, Stamford, Conn.

[21] Appl. No.: 08/886,052

[22] Filed: Jun. 30, 1997

[51] Int. Cl.[6] .................................................. G06F 17/30
[52] U.S. Cl. ......................... 707/3; 707/2; 707/4; 707/5; 707/104; 395/200.32
[58] Field of Search .................................. 707/104, 100, 707/5, 102, 1, 2, 3, 4; 706/45; 395/200.32

[56] References Cited

U.S. PATENT DOCUMENTS

| | | | |
|---|---|---|---|
| 5,210,799 | 5/1993 | Rao | 382/103 |
| 5,493,677 | 2/1996 | Balogh et al. | 707/104 |
| 5,566,246 | 10/1996 | Rao | 382/154 |
| 5,617,119 | 4/1997 | Biggs et al. | 707/104 |
| 5,710,833 | 1/1998 | Moghaddam et al. | 382/104 |
| 5,802,518 | 9/1998 | Karaev et al. | 707/9 |

OTHER PUBLICATIONS

Article by M. Ubell and M. Olson entitled "Embedding image query operations in an object–relational database management system," Proceedings SPIE Conference on Storage and Retrieval of Image and Video Databases, pp. 197–203, 1995.

S. Marcus and V. S. Subrahmanian, "Foundations of multimedia database systems", Journal of the ACM, 43 (3), pp. 474–523, 1996.

Class (College Library Access and Storage System) and the NCSTRL (Networked Computer Science Technical Report Library) systems at Cornell University as discussed by C. Lagoze and J. Davis "Dienst: An architecture for distributed document libraries" Communications of ACM, 38(4), p. 47, Apr. 1995.

Gloss (from Standford) as discussed by L. Gavarno and H. Garcia–Molina, "Generalizing Gloss to Vector–Space Databases and Broker Hierarchies," Proceedings of the 21st International Conference on Very Large Data Bases, pp. 78–89, 1995.

Whois++(from Bunyip Corporation) and Harvest (from University of Colorado) as discussed by Michael Schwartz, "Internet Resource Discovery at the University of Colorado", IEEE Computer, pp. 25–35, 1993.

*Primary Examiner*—Paul V. Kulik
*Assistant Examiner*—Jean M. Corriélus
*Attorney, Agent, or Firm*—Gary B. Cohen; Philip E. Blair

[57] ABSTRACT

Disclosed is a multimedia database for use in distributed network environments. A query processing module transforms user queries into search transformations that can be used for indexing; an attentional selection module records salient information represented in images by a hierarchy of feature maps, saliency maps and combined saliency maps; a declarative memory comprises active modules that update the representations acquired over time for the same images, as well as across images, to cluster, categorize and organize information extracted from different images by the attentional selection module; and an indexing mechanism utilizes the search transformations from the query processing module to search the declarative memory for an answer to a user query. The multimedia database is used in distributed network environments wherein a server can select and coordinate information flow between multiple database sites and user sites, provide effective multimedia representation, create indexes on multimedia content of said database sites to derive a set of target multimedia database sites and, enable database queries descriptions and final search results to be conveyed to a user, records information needed for database selection, generates useful query patterns based on memorization of responses patterns from various databases based on user queries, and directs interactive dialogue between a user and multimedia databases.

11 Claims, 3 Drawing Sheets

MULTIMEDIA DATABASE FOR USE OVER NETWORKS

FIELD OF THE INVENTION

This invention is related to databases and their implementation in networks and use by network servers and, more particularly, to a multimedia database design for use over computer networks such as the Internet.

BACKGROUND OF THE INVENTION

With the explosion of desktop publishing, the availability of digital media, and the advent of the World Wide Web (WWW), it is now possible to access large multimedia document repositories distributed throughout the world. Such access is becoming increasingly important in a number of applications including medical diagnostics, manufacturing, pharmaceutical research, surveillance, and distributed publishing of multimedia data from repositories. While data from widely distributed sources is becoming easily accessible, this also poses challenges in the design of multimedia databases as well as search agents at servers that now need to do intelligent site selection based on the integration of information from database sites and multimedia information in a query.

Accessing repositories in a distributed setting, either over a proprietary network or the more public Internet and its instantiation, the World Wide Web (WWW), poses quite a few challenges. In a typical scenario for such systems, the access to multimedia databases at remote web sites may be initiated by a client machine running a browser such as Netscape™ or Internet Explorer™. The query is processed by the browser and sent to a web server. The web server selects the target multimedia database site and poses the query to the database in an acceptable form. The indexing mechanism of the database searches its repository for possible answers to the posed query. The answer is fed back to the web server for eventual relaying to the client. As can be seen from this scenario, system issues of security, consistency, versioning, persistence, etc., that are relevant for distributed access to traditional databases are also relevant for multimedia databases. More importantly, new technical issues arise due to the nature of the multimedia data. The traditional way of accessing such databases by assigning text annotations to image and video data are insufficient to unambiguously describe the media content, not to mention the time-consuming task of manually tagging the multimedia data. Automatic database creation and image content-based indexing, on the other hand, are difficult problems, for which effective methods are yet to emerge. While it is true that these problems exist also for multimedia databases designed for a stand alone use, they are felt more keenly when such databases are designed for use in a distributed (client-server) setting. Traditional methods of designing such systems using proprietary methods of query specification and data organization and search for specific fixed queries may not be suitable in such a setting where the remote user's queries may be unanticipated and referring to image content yet unextracted. Thus, there is a need for a coherent architectural framework for the design of such a database that admits incremental construction of the database in response to dynamically changing queries.

Even when individual databases are designed in a consistent manner, other issues of web-based access have to be taken into consideration. In particular, the process of selecting the relevant databases for a given query remains a challenging problem. Even though the number of multimedia databases linked by the network may be far fewer than text databases, it is still crucial to perform a careful selection of database sites for computational reasons, particularly because of the inherent complexity in image-content-based querying of each database. Secondly, if a query is posed to several databases, the answers may need consolidation and summarization before they can be presented to a user. Finally, the transformation of a user query (who may not be aware of the databases and their capabilities) into a form suitable for querying the remote multimedia databases may require eliciting more information from the user than that provided in the original query.

Although commercial systems are being developed that allow multiple text database to be accessed over the web via SQL, ODBC or Perl gateways, methods do not seem to currently exist that allow a user to interact with multiple remotely located multimedia databases. The system that come nearest is the University of Chicago's Webseer™ system. It is modeled after traditional search engines such as Lycos™ and Alta Vista™ in that it also creates its own indexed database at the web server site by navigating known web sites and recording text as well as image related information. More common are systems, such as Webseek™, Berkeley Digital Library™, that allow web users to use their pre-designed image databases by connecting to their specific URL. Such systems often reflect closed design strategies that are optimized for handling fixed a set of queries using representations all precomputed at the time of database creation. Being client-centric, they offer little capability for sharing and a potential for duplication and inconsistency.

Previous work does exist, however, on addressing individual aspects of web-based multimedia databases, particularly, in the design of image and video databases, and resource discovery systems. Issues of image data modeling, image matching and classification, similarity metrics for image content matching, the design of efficient data structure for image content representation, and visual query languages have all been explored. These issues were, however, examined in isolation in the context of the related applications with no coherent design framework emerging. Also, because most of the work in this area has come from the computer vision community, the image database itself has been treated as a list of image files or their abstracted representations. Commercial implementations have worked on integrating them into traditional databases such as relational as BLOBS (binary large objects), object-oriented databases using text annotation, and more recently, supporting content-based querying in object-relational systems such as in Illustra as described in an article by M. Ubell and M. Olson entitled "Embedding image query operations in an object-relational database management system," Proceedings SPIE Conference on Storage and Retrieval of Image and Video Databases, pp. 197–203, 1995. Even so, only a few approaches have attempted to establish a theoretical framework for multimedia database systems, notable among these is the work on structured multimedia database systems based on a mathematical model of a media instance as discussed by S. Marcus and V. S. Subrahmanian, "Foundations of multimedia database systems", Journal of the ACM, 43(3), pps. 474–523, 1996. In these systems, the integration of multimedia data in traditional database frameworks has focused mostly on providing image-content querying capabilities by suitable encapsulation of image-based search in the respective objects. An important aspect of such multimedia databases is also the variety of representations and image data organization schemes they employ in handling queries. The suitability of traditional databases in supporting such representations is yet to be investigated.

In order to make multimedia databases web-based, a critical issue is how the capability of such databases (metadata) can be described to enable a web server to perform an intelligent selection of relevant databases in response to user queries. Most of the site selection work has been focused towards handling text information. For example, web search engines such as Lycos™ and Alta Vista™ currently create web indices in their search engines by periodically scanning potential web sites and using the text information in their resident HTML pages. But most implementations of text-based distributed systems do not perform site selection, often posing a query to all sites in parallel as done in the CLASS (College Library Access and Storage System) and the NCSTRL (Networked Computer Science Technical Report Library) systems at Cornell University as discussed by C. Lagoze and J. Davis "Dienst: An architecture for distributed document libraries" Communications of ACM, 38(4), pg. 47, April 1995. More recently, techniques from information retrieval are being used for intelligent resource site selection. Examples of such systems include GLOSS (from Stanford) as discussed by L. Gavarno and H. Garcia-Molina, "Generalizing Gloss to Vector-Space Databases and Broker Hierarchies," Proceedings of the 21st International Conference on Very Large Data Bases, pages 78–89, 1995, WHOIS++ (from Bunyip Corporation) and HARVEST (from University of Colorado) as discussed by Michael Schwartz, "Internet Resource Discovery at the University of Colorado", IEEE Computer, pages 25–35, 1993. These systems employ statistical approaches to record the frequency of occurrence of text keywords from known sites to construct an index of relevant sites for directing a query. In particular, the GLOSS (generalized glossary of servers) server keeps statistics on the available databases to estimate which databases are potentially most useful for a given query using Boolean and vector-space retrieval models of document retrieval. Another approach has been to use inference networks for the text database discovery problem. This summarizes databases using document frequency information for each term together with the inverse collection frequency of different terms. An inference network then uses this information to rank the databases for a given query. Finally, the HARVEST system provides a flexible architecture for accessing information over the Internet using "Gatherer" modules to collect information about the data resources which is passed to the "Broker" modules. A structured representation of these broker modules is kept in the Harvest server registry which, in a sense, becomes the meta-database exposing information about the individual database sites.

The present invention employs network capabilities to achieve various advantageous ends. The previous references are intended to provide a background for any appropriate network implementation required by the disclosed embodiment below for the purpose of rendering or transporting database information. Disclosures of all of the references cited and/or discussed above in this Background are incorporated herein by reference.

SUMMARY OF THE INVENTION

This disclosure is about the design and integration of multimedia databases, but more particularly for a design of multimedia databases for use over networks such as the World Wide Web. While a detailed design of a web server (called meta-server) for integrating information from multimedia database sites for intelligent selection of such sites in response to queries is described in the Detailed Description of the Invention, the focus of this disclosure and the appended claims is on the design of multimedia databases. Briefly, the invention is part of a web-based multimedia data retrieval system which integrates the information presentation capabilities of the Web browsers with the power of a multimedia database design. In designing such a system, two main technical issues must be addressed, namely, the design of multimedia database systems at web sites, and the design of a web server that can select and coordinate information flow between database sites and the user sites. A computational framework is presented for the design of multimedia database systems at Web sites. Its implementation will be explored for multimedia databases to facilitate their use over the World-Wide Web (WWW). This will include schemes for effective multimedia data representation, methods for index creation on multimedia content, in particular, image and video data, to enable the descriptions of the database queries and partial as well as final search results to the web server. A design of the web server referred to as a "meta-server" further consisting of a search agent and a meta-database is also presented. The meta-database records information needed for database site selection. This information is generated by an attentional or refining module by observing the pattern of responses of various databases to user's queries. The search agent at the web server indexes into the meta-database to derive a set of target multimedia database sites, such as the invention, and pose queries to them in respective acceptable forms. Such a server also directs interactive dialogue between the web client and multimedia databases.

The framework of the invention differs from existing image databases as well as current WWW-based server systems in several respects. (A) The multimedia database model for Web sites proposes an incremental construction of the database so as to avoid anticipation of all possible query types ahead of time and also to allow flexibility in doing extended querying during indexing. (B) The model further configures a distributed architecture that dynamically integrates knowledge from multiple sources to the generation of the search results. Recent trend in WWW-based systems has emphasized the need for databases at WWW sites rather than passive HTML pages. This model emphasizes the importance of attentionality as a key element in the multimedia data indexing/retrieval process and in multimedia database design.

A multimedia database for optimal use with such a meta-server has (a) a query processing module which transforms user queries into search transformations that can be used for indexing; (b) an attentional selection module for recording salient information represented in images by a hierarchy of feature maps, saliency maps and combined saliency maps; (c) a declarative memory further comprising active modules that update the representations acquired over time for the same images as well as across images to cluster, categorize and organize information extracted from different images by said attentional selection module; and (d) an indexing mechanism which utilizes query information from said query processing module to search said declarative memory for an answer to a query.

An architecture of a web server that addresses site selection problems for multimedia databases under the current networking environment and a complimentary multimedia design are sorely needed. The architecture establishes a foundation critical to web-based multimedia data retrieval with the potential for broad applicability as a template for the development of multimedia database systems in industry.

DESCRIPTION OF THE DRAWINGS

The accompanying drawings, which are incorporated in and form part of the specification, illustrate an embodiment of the present invention and, together with the description, serve to better explain the operation features, and advantages of the invention in a meta-server environment. It should be understood, however, that the invention is not limited to the precise arrangements and instrumentalities shown.

DETAILED DESCRIPTION OF THE INVENTION

Server/Meta-database Design

Figure 1:
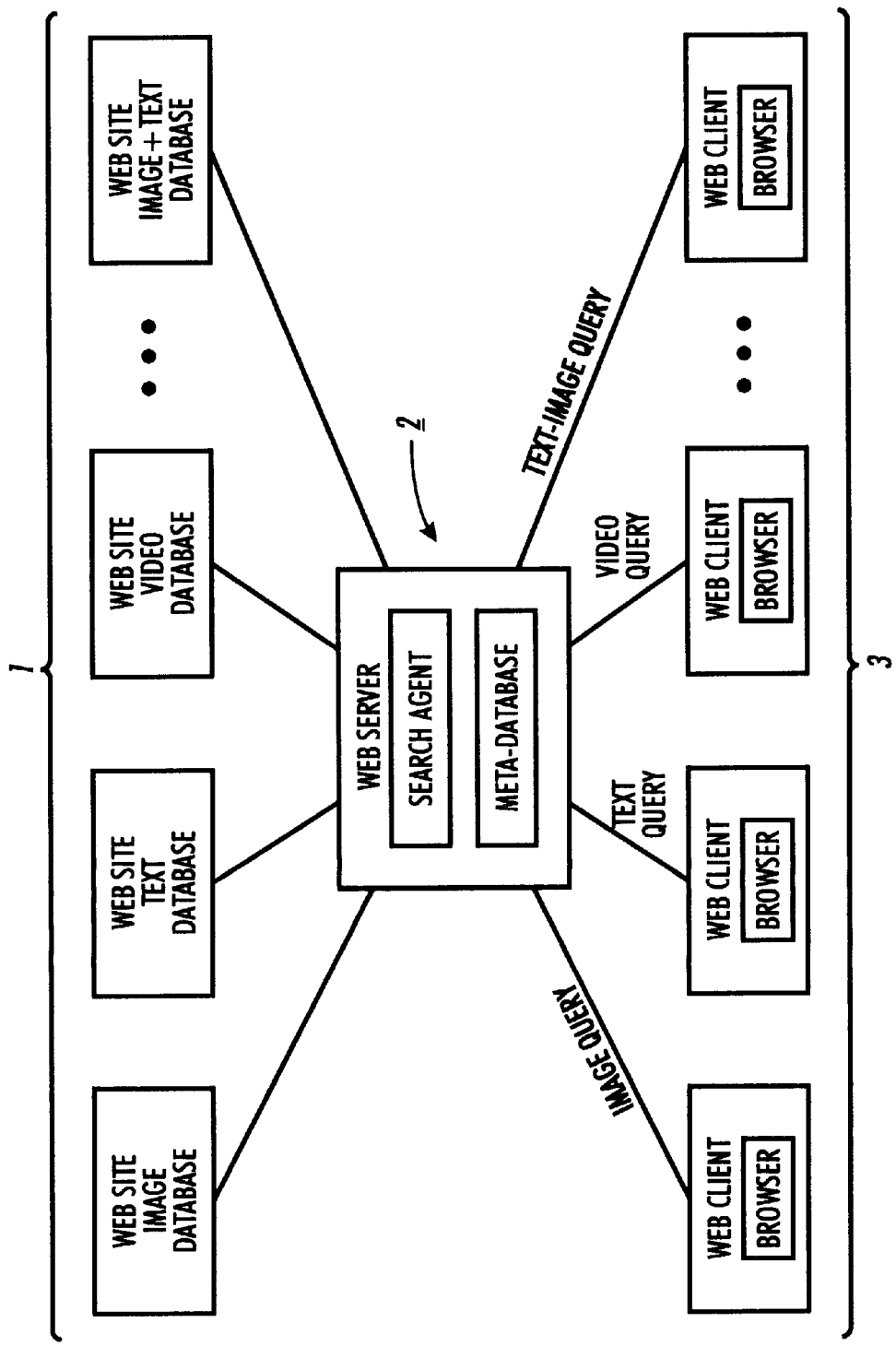
FIG. 1 illustrates a typical network system architecture for a meta-server.

Prior to describing the multimedia database design, the meta-server/database environment will be explained in order to provide an understanding for the need for a multimedia database design that compliment such a network environment. The network architecture of the meta-server/database is shown in FIG. 1. As can be seen from this figure, the three main components are multimedia database systems at web sites 1, a web server 2 consisting of a search agent and a meta-database, and a set of web applications at web clients/browsers 3. Each multimedia database system preferably manages the insertion, deletion, and update of the media data stored in each database. The meta-database records information needed for each database sites election. This information is generated by a refining module (see FIG. 2) located within the search agent by observing the pattern of responses of various databases to user's queries. The search agent at the web server indexes into the meta-database to derive a set of target multimedia database sites and poses the queries to them in their respective acceptable forms.

Figure 2:
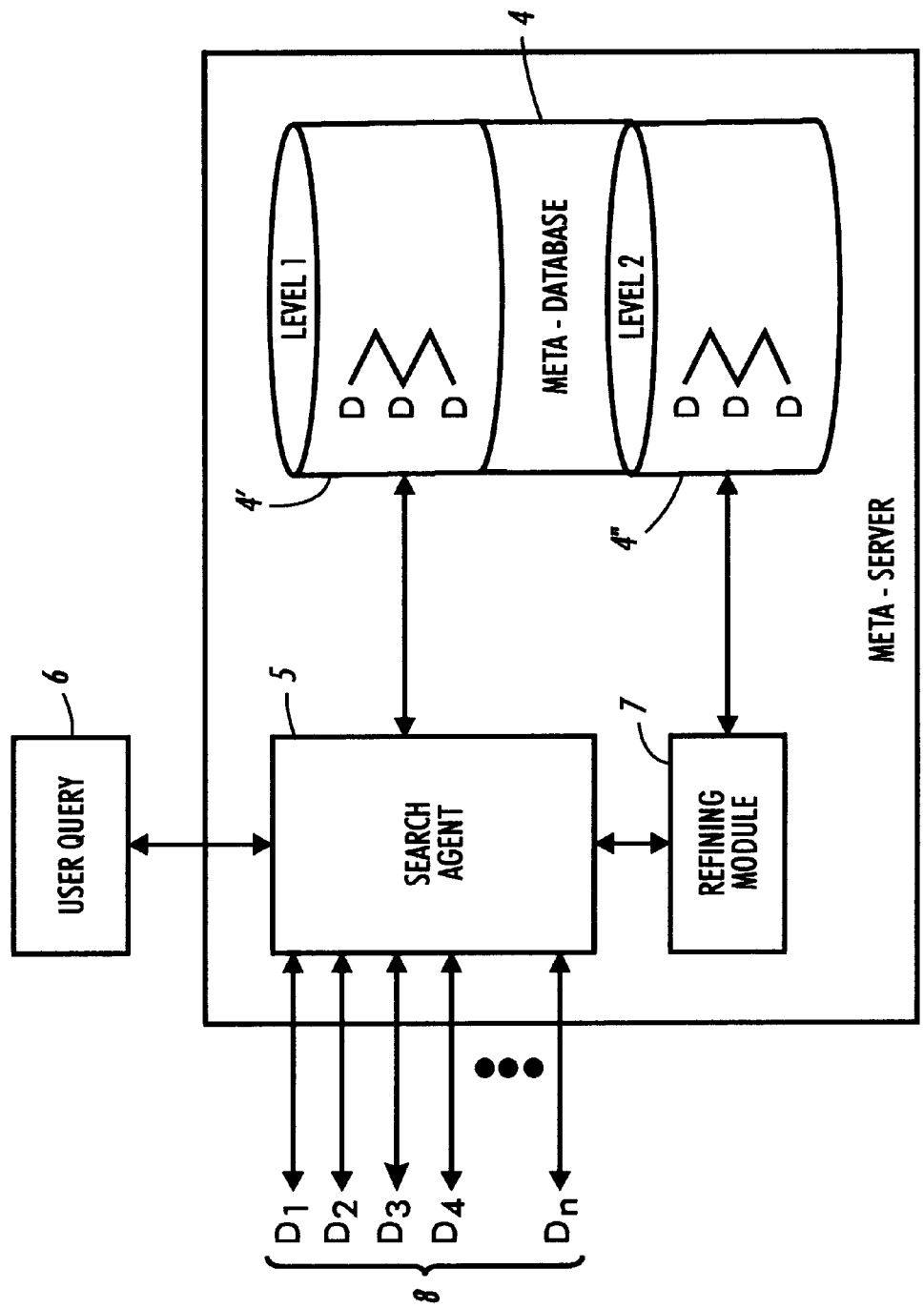
FIG. 2 is a block diagram illustrating a meta-server.

Referring to FIG. 2, the proposed architecture for the web meta-server for database site selection consists of three main modules: (1) a meta-database 4 generated from database sites 8, (2) a search agent 5 that uses information in a user query 6 to derive a set of target multimedia database sites by indexing into the meta-database 4, and (3) a refining module 7 (also referred to as training or learning module) that associates pattern of responses from the databases to queries to learn the relevance of database sites 8 for similar future queries. The activities of each of these units is described in further detail below.

The meta-database 4 at the web server possesses information about databases at web sites and organizes it in two different levels. At the first level 4', the databases at web sites can be categorized into groups based on the type of queries they support and the types of media data they house. Thus, for example, the databases that can respond to certain color classes would be grouped into one category. Similarly, the databases that can respond to a certain class of texture patterns would be grouped into another category. Obviously, a single database can belong to several groups (i.e., text and multimedia). The information needed for such a grouping is available in a text template description of each database which is filled in at the time the database registers with the web server. Such a template contains other metadata about the database such as the form of the expected query, the specialty of the algorithms supported, etc. The syntax and semantics of the text template to handle multimedia queries can be suitably resolved in any implementation of the meta-database. The database groups generated using text template-based categorization can be indexed using an abstracted text index and the machinery of conventional databases. Also at the first level, useful statistical data, such as monetary cost, latency of database sites, etc. can be stored to enable early pruning of costly sites. This alone, however, is not sufficient for handling image content queries. For example, given a texture pattern, what is the information to be extracted from the query that will help in database selection?

At the second level 4" the database sites are categorized based on the query type at the earlier level will be further grouped based on scope relevancy data for handling image content-based queries. Specifically, techniques in image-based query similarity detection are combined with statistical techniques used in text-based resource discovery systems so that indexing based on query image content yields a ranked list of database sites. This scheme allows several methods of representation of the database sites at the second level including multimedia icons and prototypical models of objects. Using this approach, the Web server will assemble the meta-database as follows. Given a set of databases at web sites, an initial meta-database is constructed from structured query templates returned by the individual databases. These templates can be periodically updated by the databases (as their capabilities change) and relayed to the web server for updation of the meta-database. The initial categorization of databases in the meta-database is used to direct queries to relevant sites. A record of responses returned and the associated queries are used by the refining module to periodically cluster the query data patterns (could be 2d textures, 2d objects, or video segments) into salient groups based on content similarity, and to update the possible relevance of databases.

While the data in the meta-database is simple (namely, the ranked list of database sites), mechanisms of indexing it can be complex. Given a query, indexing will involve selection of a relevant query prototype, which can then be used to index the relevant database sites. Note that this strategy could also be used to select text database sites although the query prototype selection task may be different.

Figure 3:
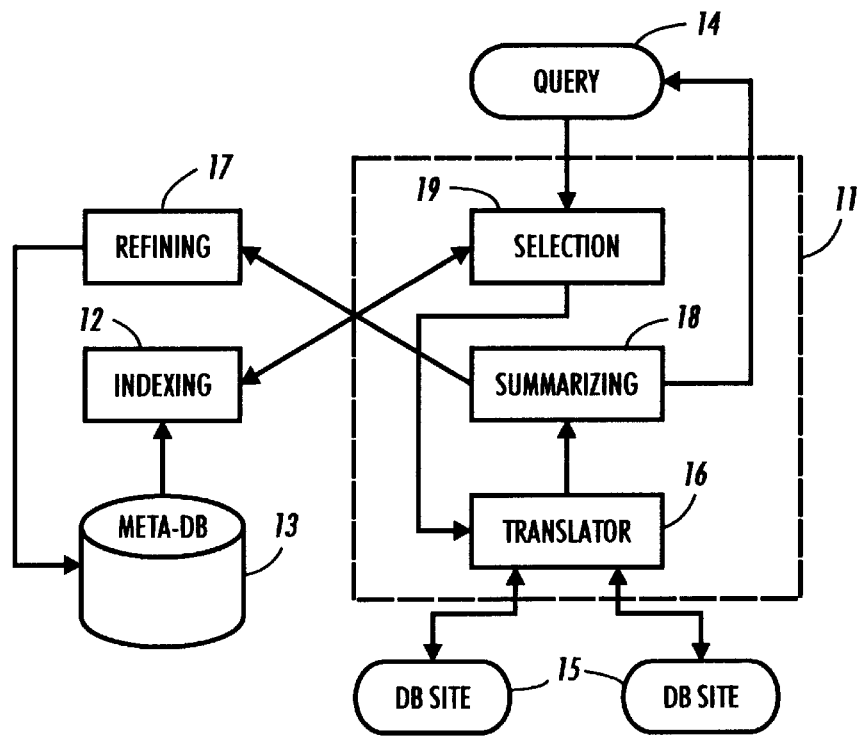
FIG. 3 illustrates a block diagram architecture for the search agent of the meta-server.

The role of the search agent 5 is to not only distribute queries to relevant database sites 8 after indexing into the meta-database 4, but to also assemble and return the database responses back to the user 6. In addition, it relays the query data patterns and the database responses to the refining module 7 for site and scope relevancy updation. Note that, since no global integration of a distributed database is being created, it is not a concern for the search agent to maintain semantic consistency constraints among component multimedia databases. However, the search agent may need to check the consistency among the retrieved information, to eliminate any duplicate information, and to finally forward the summarized information to the user. FIG. 3 illustrates the relationship among these functions. As can be seen from the figure, the search agent 11 is expected to play a more powerful role than is possible in existing search engines.

Reflecting the two-level organization of database sites in the meta-database 13, the indexing module 12 will use a two-level index to search the meta-database 13. The first-level indexing of the meta-database is done using text and qualitative information in the user query 14. Thus, starting from the user query 14, a query type category is derived to index the first level of the meta-database. The mapping of each user query to query category may be determined by a set of rules. This may require finding a semantic equivalence between the user's description and the indices for the meta-database 13. In addition, it will be concerned with the compatibility of the different databases with respect to structure and indexing capabilities.

At the second level, the index is derived from features extracted from the query data pattern (for visual queries). Several schemes of mapping from the query data to index are admissible in this framework. This may use different schemes of similarity detection between database representations in the meta-database at the second level and the given query features. For example, vectors of query data patterns will be generated based on the techniques proposed in the image retrieval approach. These two levels of indices are used by the search module to retrieve the relevant database sites. Searching at the second level is based on the image content of the query and may involve selection between several schemes of similarity detection between stored icons of the second level and the given query features. The similarity detection at this level is much coarser than would be done in the respective databases sites to return matches to queries. The result of this search is a list of database sites ranked by their relevance probabilities. If the initial site selection does not offer a sufficient pruning of the database sites, the search agent 11 can further prune these sites based on user feedback before distributing to relevant database sites 15. In addition, it should check for the semantic coherence of the indexed features and other image descriptors across the multiple databases. The information needed for making this determination may be provided by the respective databases during the process of initialization of the meta-database using query-data patterns.

After the target database sites 15 are selected 19, the user query may have to be transformed by a translator module into forms the respective databases expect. Finally, the answers returned from the databases 15 will be assimilated before relaying back to the user. This assimilation includes a refining module 17 and a summarizing module 18. The role of the refining module in the web server is to observe the pattern of responses from databases for posed queries and learn the association between visual query patterns and database responses. The answers returned from the databases together with the query data patterns are relayed to the refining module by the search agent. The refining module 17 updates the site relevancy of query-data patterns stored in the meta-database 13 based on the database responses to the posed query 14. This task could be complex in the context of image data, because the query patterns used in the posed queries can be much broader than the query-data patterns supported by web database sites. A set of generic rules will be constructed to conduct the refinement of the site relevancy of query-data patterns extracted from web database sites.

The refining module is also expected to periodically cluster the query data patterns (could be 2d textures, 2d objects, or video segments) into salient groups based on content similarity. Note that such operations could be performed off-line, perhaps as overnight updations, rather than during user querying. The result of such clustering could very well form the basis of level 2 of the meta-database.

The summarizing module 18 will check the consistency among the retrieved information, to eliminate any duplicate information, and then to forward the summarized information to the user 14. As web database sites are considered as independent data resources, it is therefore likely that different web sites contain duplicate information. The summarizing module 18 will detect such multiple occurrences and take them into account by summarize such data into a format easily assimilated by a user. Knowledge on duplicated resources are also gradually accumulated by the module and this information will be fedback to refining 17, indexing 12 and selection 19 modules for future efficient query processing.

Multimedia Database Design

From the above detailed description of the meta-server/database implementation, it can be appreciated that a multimedia database design for database sites is needed that will compliment the meta-server/database concept. In general, the design of a multimedia database system is reflected in the information extracted at database creation, its organization and the nature of the query. In proposing an approach to the design of multimedia databases, observe that the creation and retrieval of media data from databases have a parallel with visual recall of facts and events in humans. Accordingly, presented is one computational model of multimedia database design by drawing a paradigm from the human visual scene recall mechanism. The intention in doing so is to obtain a conceptual view of the processing involved.

Figure 4:
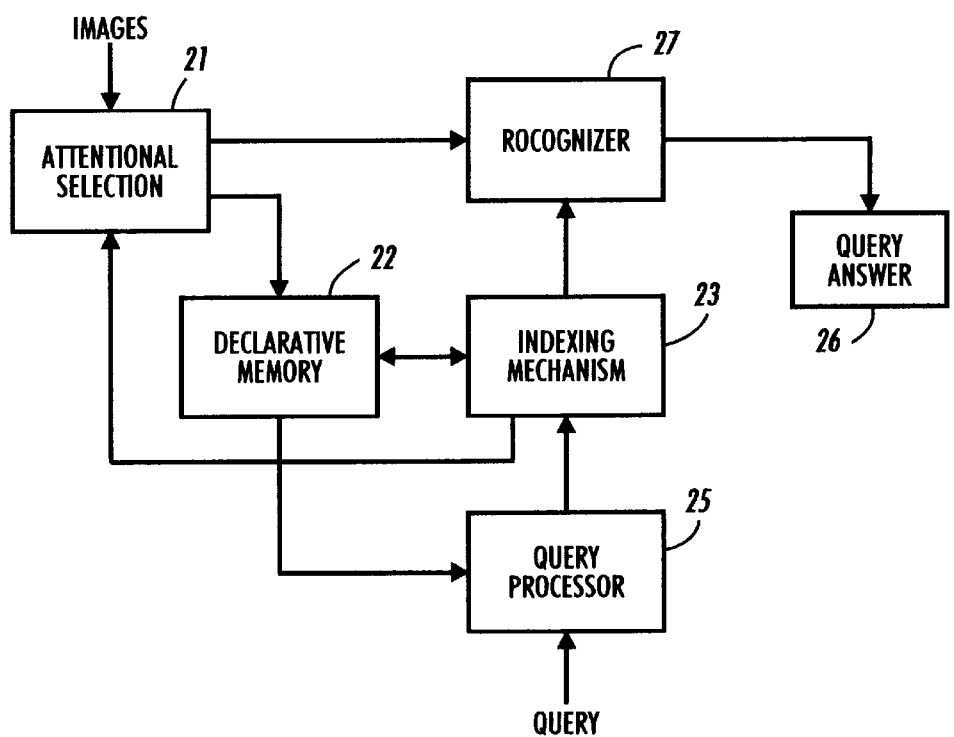
FIG. 4 illustrates the invention, a multimedia database system.

A central idea to the computational model is that attentional selection plays a role in the formation of media data representations in declarative memory and in query-specific recall during indexing. According to the model shown in FIG. 4, a multimedia database system should preferably consist of at least three distinct modules, namely, attentional selection 21, declarative memory 22 (or database) and an indexing mechanism 23. When an image is first seen, the information in the image is processed by the attentional selection mechanism 21 whose goal is to record salient information represented in the image. The information in the media data is represented by this mechanism as a hierarchy of three types of maps called feature maps, saliency maps and combined saliency maps. The feature maps extract image-based features such as color and texture. The individual saliency maps indicate the salient regions within these feature maps. Finally, the combined saliency maps abstract the salient information across all feature dimensions. It is these saliency maps that form the backbone representations of media data in the declarative memory. Besides being a passive repository of information, the declarative memory consists of active modules that update the representations acquired over time for the same image as well as across images to cluster, categorize and thereby organize information extracted from different images by the attentional mechanism. When a QUERY is posed to the system, the query processing module 25 takes the user query and transforms it into a version that can be actually used for indexing. This transformation might be direct or might require further dialogical interaction with the user. The indexing mechanism 23 uses the result of the transformation to search the database 22 (declarative memory) for an answer to the query. If the answer to the query can be generated but it is not directly available from the stored media data description, the relevant retrieved media data are re-processed by the attentional selection module 21, now operating in a task-driven mode to find salient information pertaining to the query. If the answer 26 to the query is recognized with recognizer 27 in the resulting representations, this is conveyed back to the user who can confirm to what extent the answer is relevant to his/her query semantics. On this basis, the newly formed representation is then fed back to the declarative memory 22 to be combined with the existing representations for the image as well as across images.

From the above description, the present design features for multimedia databases emerge. The model proposes that in the absence of any query-specific information at the time of database creation, things that pop-out or salient in media data are extracted. Often, these map to the things that are most likely to be queried in the media data. In addition, during this phase, processing for standard content-based queries, such as color, may be done to create the respective saliency maps. It also proposes that query-specific salient information be extracted during retrieval indicating that the indexing operation involves computations instead of a simple look up of pre-computed information. The model also proposes an incremental construction of the database so as to avoid anticipation of all possible queries ahead of time and also to allow flexibility in doing extended querying during indexing. This is a departure from existing methodology wherein all the query types are anticipated and the system design is optimized for these query types. Lastly, by having the attentional selection module for content extraction both during database creation and indexing, it emphasizes a design strategy requiring automatic region isolation methods.

While the computational model is applicable for the design of both stand alone and web-based media database systems, its design principles are particularly suitable for web-based access, where unanticipated queries and dynamic updating of information based on pattern of queries is common. Also, within this framework, several feature extraction schemes, and indexing schemes are admissible. Based on this computational model, the use scenario of the proposed web-based multimedia database system together with the meta-server changes as follows. When the client machine running a web browser requests information relating to image content in a query, the query is processed by the browser and sent to a web server (meta-server). Whenever possible, the web server selects the relevant target image database sites and poses the query to the indexing mechanisms of the databases in an acceptable form. Each indexing mechanism searches its database for possible answers to the posed query. If no answer is found, the database activates its alternative processing mechanism (attentional selection) to select the desired information from candidate images of the database. The answer is fed back to web server (meta-server) for eventual relaying to the client for further filtering. Relevant answers may be recorded in its database initiating a cycle of data organization within the database, and updating its profile in a meta-database at the web server (meta-server). Future inquiries relating to this content portion will not need visual processing and can be indexed fast.

Implementation of the Computational Model

As is evident from the computational model, several issues have to be addressed to make media content-based retrieval efficient, especially when it is done over the Internet. Computer vision-based techniques addressing issues of representation, image decomposition, database organization, query recognition and retrieval in the domains of image and video databases had to be resolved. Some of these techniques, which are applicable to the invention are described below.

A. Image Feature Extraction

Several methods of image feature extraction are available and known in the art—these include methods for extracting information about edges, curves, color, texture, etc, Work in computer vision also involving developing color and texture-based segmentation algorithms are applicable here. Algorithms for supporting image texture content queries using textural energy features derived from low and high pass spatial frequency bands using a multi-level wavelet-based subband decomposition have been developed by designers and can be applied within the invention. The database design is intended to provide an open architecture for allowing different feature extraction schemes (possibly developed by other researchers) including methods for handling new types of queries.

B. Image decomposition

In content-base querying of images (or video frames), often the answer to a query lies in a small region of the image (small segment of the video). Performing detailed segmentation into object-containing regions to enable subsequent query matching is not only computationally expensive but almost impossible to achieve. An alternative is to decompose the image into meaningful groups that are likely to contain single objects using grouping methods developed in computer vision. Grouping methods, however, avoid generating all possible groups to keep computational costs low, thus leading to false negatives in query localization. In such cases, a scheme of image decomposition using a hierarchical overlapping window structure such as the nona-tree where the image region spanned by each level in the hierarchy is divided into nine overlapping segments could be useful.

C. Image organization

Organizing images in the database by clustering in a feature space derived from images has been a popular technique used in the past. Since such methods do not incorporate spatial location information, they can give false matches during indexing. Approaches have been investigated for the clustering of image data wherein spatial information has been somewhat preserved by dividing the into nonoverlapping regions and judging the similarity between images by techniques such as measuring the number of subregions in one image that are similar to some subregion in the others.

Images in a database can also be categorized in hierarchical clusters on the basis of their similarity to a set of iconic images. This method is particularly suitable for texture queries. When the queries refer to 2d or 3d objects that appear in images of the database under changed imaging conditions (pose variations, illumination variations, occlusions), such pattern clustering methods are no longer sufficient. In such cases, a method of database organization based on the technique of geometric hashing may be possible.

D. Handling different queries

A variety of queries ranging from qualitative (and non-shape-based) ones such as color, to more shape-based queries such as 3d objects, 2d objects and texture patterns can be handled. One said method for fast indexing of a large image database for color surface reflectance class queries has been available. Using the color surface reflectance class, (rather than a color vector in an unstable color space such as RGB space) allows a more accurate detection of matches to color queries (low false negatives) as well as good distinguishibility between similar-looking colors (low false positives).

Various applications require querying by example texture patterns. For example, in a biomedical image, an anomaly such as a tumor in a diagnostic image can be captured in an iconic texture representation. Methods for searching iconic texture queries using techniques from fractal image compression and texture features derived from transformed images are useful.

One of the challenging problems in image databases is the retrieval of images based on shape queries. Defining shape similarity, however, has been found to be difficult with no rigorous approaches emerging that capture the various semantic qualities that humans assign to shapes. An approach that formulates shape similarity detection as the problem of determining the class or category of an object is also useful when applied within the invention. Such a method will have applications both in flexible querying and in database organization for efficient indexing.

While work continues on developing techniques for handling image as well as other multimedia content (such a video and audio), the objective of this disclosure is to integrate such techniques into the present computational framework of multimedia database design. Methods developed by other researchers can be incorporated after they have been transformed to fit the present computational model.

From the techniques described in the above sections, the usefulness of the complete image database system, herein presented and claimed for applications in both stand alone use and in web environments, is apparent.

The foregoing description of the invention has been presented for purposes of illustration and to describe the best mode known for implementation of the invention. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and any examples be considered as exemplary only, with the true scope and spirit of the invention being indicated in the following claims.

I claim:

1. A database using text and multimedia, the database containing at least one image with salient information represented therein, comprising:
   a) a query processing module for transforming user queries into search transformations that are usable in both searching and indexing information in the database;
   b) an attentional selection module for extracting the salient information represented in the at least one image contained within the multimedia database, said attentional selection module automatically inferring the salient information represented in the at least one image;
   c) a declarative memory, communicating with said attentional selection module, for categorizing, organizing, and recording the salient information extracted from the at least one image by said attentional selection module;
   d) an indexer, communicating with both said query processing module and said declarative memory, for using the search transformations from said query processing module to search said declarative memory for an answer to a user query wherein answers to said queries are conveyed back to a user who can confirm to what extent said answer is relevant to said user's query and a newly formed representation is conveyed back to said declarative memory and combined with existing representations.

2. The database of claim 1, wherein said declarative memory further comprises active modules for updating representations acquired over time for the at least one image.

3. The database of claim 1, in which media data is retrieved, wherein the retrieved media data is reprocessed by said attentional selection module to find salient information pertaining to at least one of the user queries.

4. The database of claim 1, in which the database undergoes creation, wherein said attentional selection module extracts information content during database creation and during indexing.

5. The database of claim 1, wherein the salient information is configured within the at least one image to facilitate said automatic inferring.

6. The database of claim 5, wherein the salient information includes feature maps, saliency maps and combined saliency maps.

7. The database of claim 6, wherein the feature maps, the saliency maps, and combined saliency maps are arranged hierarchically.

8. A method for use with a database containing at least one image with salient information represented therein and including a declarative memory, comprising:
   a) transforming user queries into search transformations that are usable in both searching and indexing information in the database;
   b) extracting the salient information from the at least one image, said extracting including automatically inferring the salient information represented in the at least one image;
   c) categorizing, organizing and recording the extracted salient information for the declarative memory; and
   d) using the search transformations to search the declarative memory for an answer to a user query wherein answers to said queries are conveyed back to a user who can confirm to what extent said answer is relevant to said user's query.

9. The method of claim 8, further comprising updating representations acquired over time for the at least one image.

10. The method of claim 8, further comprising configuring the salient information represented in the at least one image as a hierarchy of feature maps, saliency maps and combined saliency maps.

11. The method of claim 8, in which the database undergoes creation, further comprising extracting information during both database creation and said (d).

* * * * *